US006894818B1

(12) United States Patent
Cicchiello et al.

(10) Patent No.: US 6,894,818 B1
(45) Date of Patent: May 17, 2005

(54) CONFORMAL ALL-REFLECTIVE BEAM-STEERING (CARBS) DEVICE

(75) Inventors: James M. Cicchiello, Cary, IL (US); Michael A. Davis, Elgin, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 27 days.

(21) Appl. No.: 10/723,089

(22) Filed: Nov. 25, 2003

(51) Int. Cl.[7] ............................................. G02B 26/08
(52) U.S. Cl. ..................... 359/223; 359/226; 359/208; 359/853; 359/858
(58) Field of Search .................. 359/212–223, 359/226, 208, 727–731, 850, 853, 856–858

(56) References Cited

U.S. PATENT DOCUMENTS 3,211,046 A * 10/1965 Kennedy ..................... 359/219
6,078,420 A * 6/2000 Macken ....................... 359/208

* cited by examiner

Primary Examiner—James Phan
(74) Attorney, Agent, or Firm—Stetina Brunda Garred & Brucker

(57) ABSTRACT

A conformed all-reflective beam-steering (CARBS) device is provided which is a hybrid of a mirror and one-axis gimbal assembly mounted on a rotating carriage. The CARBS device functions as a coarse-steering element in an electro-optical tracking system. The one-axis gimbal only has to steer over 0–45° elevation (El), rather than the more typical +/−45° El. To provide a full field of regard (FOR), the present invention relies on a rotating carriage to rotate 360°. The present invention facilitates the full FOR by positioning a mirror and one-axis gimbal assembly close to the exit pupil window. Further, the present invention takes advantage of decentration and off-axis parabolic reflectors to maintain a small footprint. This compact design allows for lower system inertia, which reduces power draw, and further provides a system which may be package to meet upcoming military modular packaging requirements.

41 Claims, 3 Drawing Sheets

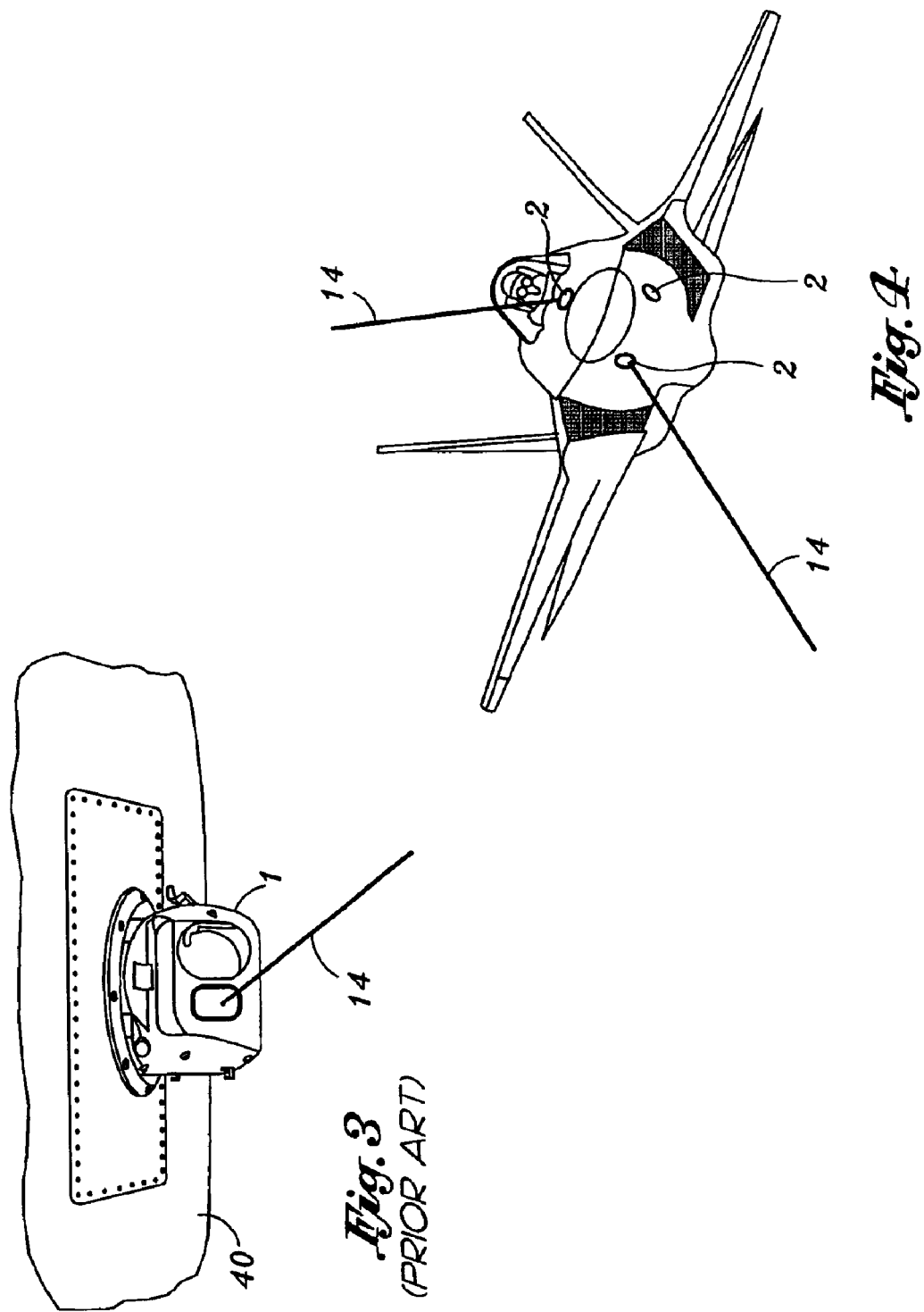

CONFORMAL ALL-REFLECTIVE BEAM-STEERING (CARBS) DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to laser beam steering systems. In particular, the present invention relates to an all-reflective coarse-steering element designed to conformally fit or to be flushly integrated in a modular manner with the outer surface of a body of a vehicle such as an aircraft, spacecraft, ocean vessel, land conveyance vehicle or the like.

2. Background of the Invention

Precise and controllable delivery of laser beams to a desired location is an important technology with respect to telecommunications, military, and other general industrial applications. The most common means of obtaining such delivery is the use of large (i.e. macroscopic) mechanically controlled mirrors, lenses and gimbals to steer laser beams. While this technology is mature, it is limited by the mechanical nature of mirror movement. Furthermore, inertial properties of mechanically driven mirrors limit the speed with which steering can be changed.

There are numerous new beam-steering applications which have been identified; however, current beam-steering technology does not exist to support such identified applications. For instance, in the near term, new technologies for beam-steering systems must facilitate self-protection [techniques-based infrared countermeasures (IRCM)], targeting, passive and active searching and tracking, and free-space optical (FSO) communications. These systems must accommodate, in the longer term, damage-and-degrade-based ($D^2$) infrared countermeasures. The new beam-steering technologies must also be "conformal" to the outer skin of a vehicle, such as an aircraft, in order to reduce aerodynamic drag, reduce radar cross section, and minimize the obscuration to adjacent electro-optic (EO) systems.

These aforementioned emerging approaches are often referred to as "non-gimbal based" technologies. Numerous approaches have been funded through government programs including STAB ("Steered Agile Beams"), MEDUSA ("Multi-function Electro-Optics for Defense of US Aircraft"), THOR (TeraHertz Operational Reachback"), CCIT (Coherent Communications, Imaging, and Targeting"). Approaches involving rotating-prisms, flexible waveguides, liquid-crystals (LC), MEMs-based deformable mirrors (DM), acousto-optics, and other technologies are presently being funded.

Among both known and emerging approaches, none presently meet or are forecasted to meet the following specifications, within reasonable size, weight, and power requirements (SWAP): (1) the ability to be installed conformally with the skin of a vehicle, and still achieve a steering field of regard (FOR) of 180° Az and +/−45° El.; (2) the ability to maintain achromaticity over the range of 1 $\mu m < \lambda < 12 \mu m$; and (3) the ability to maintain both coherence and phase across the wavefront.

For example, approaches that are not based on all-reflective optics can generate some level of pointing error when steering two different wavelengths (achromaticity). Further, a general problem with array-based agile designs is that they can disrupt the phase uniformity of the wavefront, leading to problems in coherent-imaging schemes, as well as temporal spreading of the pulse in FSO-communications designs [i.e., the true-time delay (TTD) problem].

Other approaches have been suggested which would utilize existing technologies, such as a ball-turret (see FIG. 3 for an example of prior art electro-optic ball-turret) recessed into the vehicle body. However, the downside of this approach is that to obtain a full field of regard (FOR) a large window is required. This approach is further not feasible because the ball-turret must be deeply recessed and positioned within the body of the vehicle. Such an approach would simply utilize too much space within the vehicle.

Another approach that has been suggested as a conformal package is to implement a rotating prisms concept, which utilizes two prisms that rotate against each other. However, this approach is not desirable because the system is not entirely reflective, and as a result, there is a pointing error among different colors of the spectrum.

One approach that can be successfully implemented to meet the aforementioned requirements [(1) ability to be installed conformally with the skin of a vehicle, and still achieve a steering field of regard (FOR) of 180° Az and +/−45° El.; (2) maintenance of achromaticity over the range of 1 $\mu m < \lambda < 12 \mu m$; and (3) maintenance of both coherence and phase across the wavefront] is to provide an electro-optical system having all upstream off-gimbal components except for the coarse-steering element. For instance, the design may incorporate modern technologies such as adaptive optics for the fine-steering elements, however, the final coarse-steering element will utilize conventional mirror and gimbal technology. However, currently to date, no embodiments of the aforementioned concept have been successfully reduced to practice.

Thus, overall, in order to support multifunctional electro-optical missions, it would be advantageous and desirable to provide an ideal beam-steering device which would be both conformal and all-reflective. Such a device potentially could be used in a multi-functional manner for self-protection and FSO-communications missions, for example. Furthermore, it would be desirable to provide a coarse-steering element which is compact in size and of which has a smaller window profile. In particular, it would be beneficial to provide a final coarse-steering element, such as a one-tilt mirror gimbal assembly, which may be positioned very close to the exit pupil window of the EO system such that a conformal all-reflective design may be accomplished with a reasonable SWAP (size, weight and power). Additionally, it would be advantageous to package the entire optical device into a modular configuration such that it will meet specific modularity requirements set forth for upcoming military programs.

BRIEF SUMMARY OF THE INVENTION

The present invention provides a conformal all-reflective beam-steering (CARBS) device which is a hybrid of a mirror and one-axis gimbal assembly mounted on a rotating carriage. The CARBS device functions as a coarse-steering element in an electro-optical tracking system. The one-axis gimbal only has to steer over 0–45° elevation (El), rather than the more typical +/−45° El. To provide a full field of regard (FOR), the present invention relies on a rotating carriage to rotate 360°. The present invention facilitates the full FOR by positioning a mirror and one-axis gimbal assembly close to the exit pupil window. Further, the present invention takes advantage of decentration and off-axis parabolic reflectors to maintain a small footprint. This compact design allows for lower system inertia, which reduces power draw, and further provides a system which may be package to meet upcoming military modular packaging requirements.

The present invention is further designed to meet, the following requirements: (1) an ability to be installed conformally with the skin of a vehicle, and still achieve a steering field of regard (FOR) of 180° Az and +/−45° El.; (2) maintenance of achromaticity over the range of $1 \mu m < \lambda < 12 \mu m$; and (3) maintenance of both coherence and phase across the wavefront. These requirements are met by providing an electro-optical (EO) system which utilizes all off-gimbal components except the coarse-steering element. For instance, the present invention may incorporate modern technologies such as adaptive optics for the fine-steering elements, however, the final coarse-steering element utilizes conformal all-reflective beam-steering (CARBS) device.

According to an exemplary embodiment of the present invention a beam-steering device is provided. The device includes a carriage adapted to rotate about a first axis, wherein the carriage has an inboard region and an outboard aperture. An upper off-axis parabolic reflector is adapted to receive or reflect a beam directed generally along the first axis and receive or reflect the beam in a generally radial direction generally orthogonal to the first axis. A right-angle reflector is radially offset from the upper reflector and adapted to receive or reflect the beam in a generally radial direction to or from the upper reflector and receive or reflect the beam in a generally axially direction which is radially offset from said first axis. A lower off-axis parabolic reflector is adapted to receive or reflect the beam to or from the right angle reflector and to receive or reflect the beam in a radially direction generally through and orthogonal to the first axis, wherein the lower reflector is positioned axially adjacent the right angle reflector such that the primary optical axis of the beam intersects an on-axis focus point of the lower reflector. A mirror and one-axis gimbal assembly is positioned 180 degrees radially opposite the lower reflector and adapted to rotate about a second axis being radially offset from and orthogonal to the first axis, the mirror adapted to receive or reflect beams radially reflected from the lower reflector and to receive or reflect beams through the outboard aperture.

According to an aspect of the present invention, the device is totally all reflective. According to another aspect of the present invention, the device is adapted to be installed conformally and flush with the skin of a vehicle. According to still another aspect of the present invention, the device achieves a steering field of regard (FOR) of 180° Az and +/−45° El and maintains achromaticity over the range of $1 \mu m < \lambda < 12 \mu m$. Moreover, when the beam is transmitted from the device, maintenance of both coherence and phase across the wavefront is achieved.

According to another aspect of the present invention, the carriage includes a cylindrically-shaped body and a retaining base which is adapted to rotatably receive and retain the cylindrically-shaped body, wherein retaining base is adapted to be rigidly mounted to a vehicle structure. According to yet another aspect of the present invention an exit pupil window is securely attached to the retaining base of said rotating carriage. Furthermore, the one-axis gimbal assembly steers only over 0–45 degrees El.

According to other aspects of the present invention, the initial diameter of the beam is telescopically magnified to a final diameter $d_f$ and the final diameter $d_f$ is between about 30–50 mm depending on the mission. Additionally, the telescopic magnification occurs between the upper reflector and the lower reflector. Moreover, a mechanical range of motion $\theta$ of the mirror about a tilt axis of the one-axis gimbal assembly is about 0–22.5 degrees, wherein an optical steering range $\alpha$ of 0–45 El degrees is produced.

According to a further aspects of the present invention, the beam-steering device is in combination with a fine-steering element. Other aspects of the present invention include the outboard aperture having a diameter ranging from about 3 to 4 inches. According to a further aspect of the present invention, the carriage is adapted to rotate 360 degrees about the first axis in a clockwise and counterclockwise direction. According to a further aspect of the present invention, the one-axis gimbal assembly and mirror further outwardly offset a predetermined distance x from the primary optical axis of the beam.

According to another aspect of the present invention, the one-axis gimbal has a tilt element centered about the second axis, wherein the second axis is oriented in parallel with respect to the exit pupil window, and further wherein the second axis is positioned substantially proximate an interior surface of said exit pupil in the outboard aperture. According to another aspect of the present invention, the mirror having a lowest edge connected to the tilt element such that the mirror hingedly rotates about the tilt element.

According to an another exemplary embodiment of the present invention, a conformal and all-reflective beam-steering device is provided. A rotating carriage is adapted to rotate 360 degrees about a first axis, wherein the carriage has an inboard region and an outboard aperture. An upper off-axis parabolic reflector has a first concave reflective surface centered about the first axis, the upper reflector is adapted to receive or reflect a beam directed generally along the first axis and receive or reflect the beam in a generally radial direction generally orthogonal to the first axis, and the upper reflector is fixedly attached to a first portion of the inboard region of the rotating carriage. A right-angle reflector is radially offset from the upper reflector and arranged such that a reflector surface of the right angle reflector is centered about and oriented at a 45 degree angle with respect to a primary optical axis of the beam, the right angle reflector adapted to receive or reflect the beam in a generally radial direction to or from the upper reflector and adapted to receive or reflect the beam in a generally axially direction which is radially offset from said first axis, and wherein the right angle reflector fixedly attached to a second portion of the inboard region of the rotating carriage. A lower off-axis parabolic reflector has a second concave reflective surface positioned to receive or reflect the beam to or from the right angle reflector and to receive or reflect the beam in a radially direction generally through and orthogonal to the first axis, the lower reflector is positioned axially adjacent said right angle reflector such the primary optical axis of the beam intersects an on-axis focus point of said lower reflector, and the lower reflector fixedly attached to a third portion of the inboard region of the rotating carriage. A mirror and one-axis gimbal assembly is positioned 180 degrees radially opposite the lower reflector and fixedly attached to a fourth portion of the rotating carriage, the mirror assembly is adapted to rotate about a second axis being radially offset from and orthogonal to the first axis, and is further offset a predetermined distance from the primary optical axis of the beam, and the mirror assembly has a tiltable reflective surface oriented to receive or reflect beams radially reflected from the lower reflector and to receive or reflect beams through the outboard aperture.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 3 depicts a conventional prior art electro-optical infrared laser ball-turret installed and integrated into the fuselage of an aircraft; and FIG. 4 depicts the present invention (CARBS) integrated into an aircraft's fuselage such that the eye pupil window of the CARBS device is conformal to the outer skin of an aircraft, according to an aspect of the present invention.

DETAILED DESCRIPTION OF THE INVENTION

Figure 1:
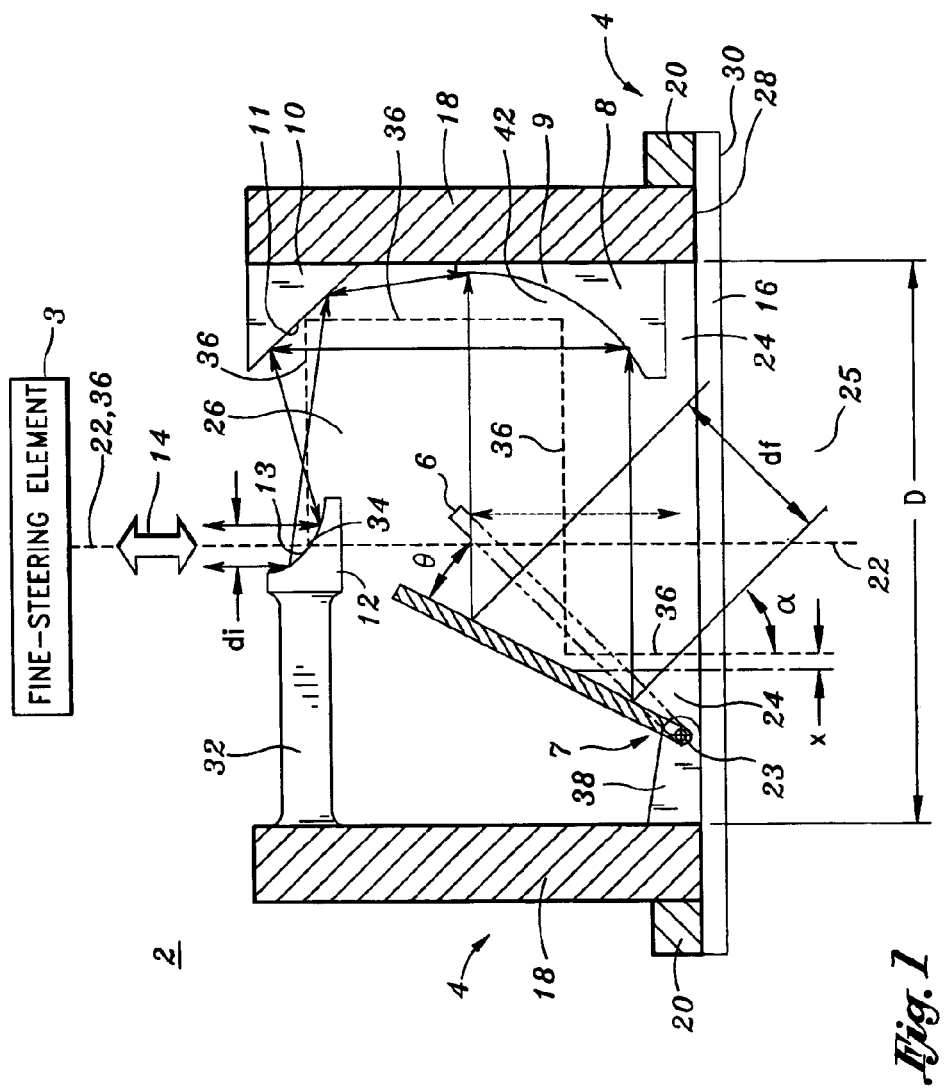
FIG. 1 is an illustration of an exemplary embodiment of a conformal, all-reflective beam-steering (CARBS) device.
Figure 2:
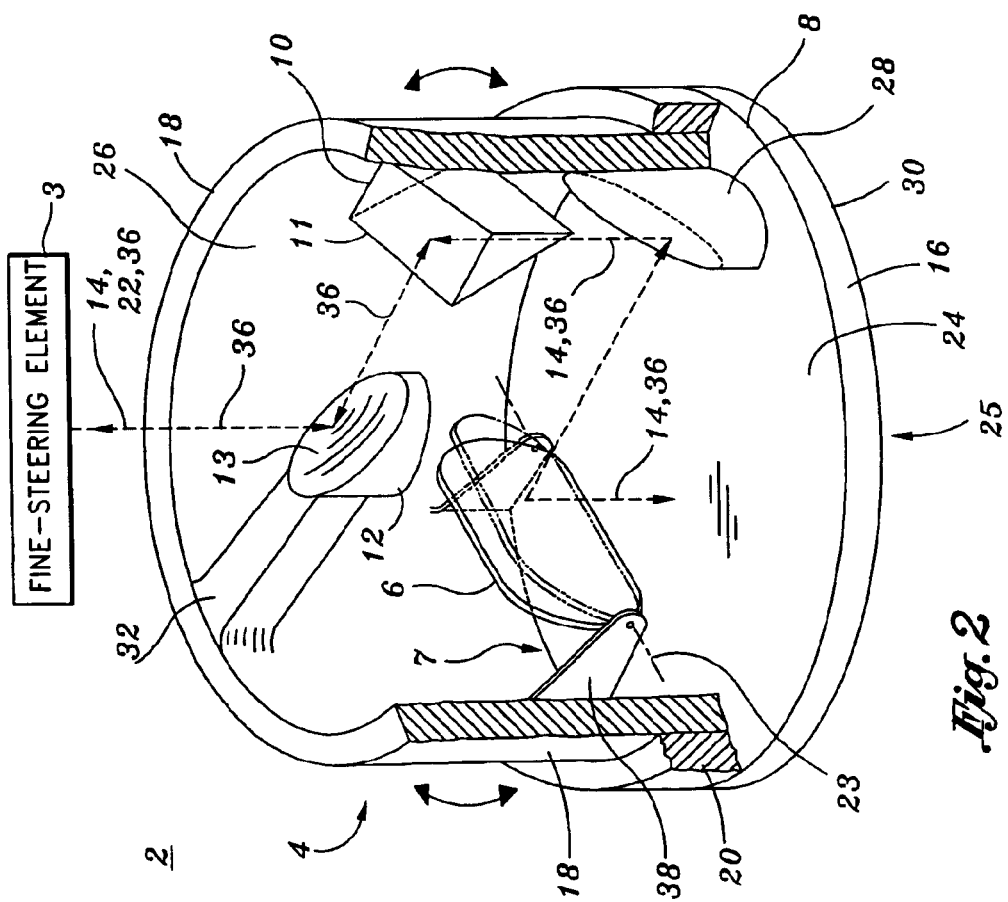
FIG. 2 is perspective view of the exemplary embodiment of the conformal, all-reflective beam-steering (CARBS) device.

FIG. 1 is a side view illustration of an exemplary embodiment of the present invention referred to as a conformal all-reflective beam-steering (CARBS) device 2. FIG. 2 is an upper perspective view of the same exemplary embodiment of the CARBs device 2. It is initially noted that the exemplary embodiment described herein is presented in a simplified schematic manner. The particulars shown herein are by way of example and for purposes of illustrative discussion of one of many possible embodiments of the present invention and are presented in the cause of providing what is believed to be the most useful and readily understood description of the principles and conceptual aspects of the present invention, an all-reflective beam-steering (CARBS) device 2. In this regard, no attempt is made to show structural details of the present invention in more detail than is necessary for the fundamental understanding of the present invention. The description in view of the drawings makes apparent to those skilled in the art how the several forms of the present invention may be embodied in practice.

Overview of the Components of the CARBS Device

The design of the conformal all-reflective beam-steering (CARBS) device 2 is a hybrid of a mirror and one-axis gimbal assembly mounted on a rotating carriage. An exemplary embodiment of the CARBS device 2, as shown in FIGS. 1 and 2, primarily comprises a rotating carriage 4, mirror 6 and one-axis gimbal assembly 7, lower off-axis parabolic reflector 8, folding mirror 10, upper off-axis parabolic reflector 12, and exit pupil window 16. The reflective components (mirror 6, lower off-axis parabolic reflector 8, folding mirror 10, upper off-axis parabolic reflector 12) are considered "all reflective" and preferably are coated to reflect about 1 to 10 μm of light. The manner in which these aforementioned features are arranged, integrated and packaged allows for lower moving weight. This in turn allows for lower system inertia and reduction in power draw. The arrangement, integration and packaging of the aforementioned components is now herein discussed below.

The CARBS device 2 is built upon the rotating carriage 4 which may have a cylindrically-shaped body 18 and a retaining base 20 which is adapted to rotatably receive and retain the cylindrically-shaped body 18. The retaining base 20 is preferably securedly fixed within the vehicle, while the cylindrically-shaped body 18 is adapted to rotate within the retaining base 20, and therefore, also within the vehicle. The cylindrical-shaped body 18 may be centered about a first axis 22 and is adapted to rotate about axis 22 a full 360 degrees. The carriage body 18 may be defined as having an aperture region 24, an outboard region 25, and inboard region 26 within the carriage body 18. Preferably, the aperture region 24 of the carriage body 18 has a diameter D ranging from about 3 to 4 inches, however, the aperture size may vary depending on each specific application. The exit pupil window 16 is positioned over the aperture region 24 and flushly attached to the outboard surface 28 of the carriage body 18. The exterior surface 30 of the pupil window 16 defines an exterior surface of the CARBs device 2. Thus, the exterior surface 30 of the pupil window 16 is the portion of the CARBs device 2 which conforms to the exterior surface of the aircraft, missile, spacecraft, vehicle or the like of which the CARBS device 2 is integrated within.

In the most inboard region 26 of the carriage body 18, a first brace structure 32 may be provided to support the upper off-axis parabolic reflector 12. The upper reflector 12 is positioned such that a central ray axis 34 of the upper reflector 12 is centered and aligned coincident with the first axis 22. Moreover, the primary optical axis 36 of the beam 14 is also coincident with the first axis 22 before the beam 14 is reflected from a concave reflective surface 13 of the upper off-axis parabolic reflector 12. The concave reflective surface 13 of the upper reflector 12 is adapted to receive or reflect a beam 14 directed generally along the first axis 22 and receive or reflect the beam 14 in a generally radial direction generally orthogonal to the first axis 22. Preferably, the upper parabolic reflector 12 has a clear aperture ranging from about 40 mm to 60 mm, a decenter ranging from about 40 mm to 60 mm, and a parent focal length measured from the vertex ranging from about 40 mm to 60 mm. Additionally, in another embodiment, a convex off-axis parabolic reflector may be used as a substitute or equivalent to the upper parabolic reflector 12.

The folding mirror 10 or right angle reflector is radially offset from the upper parabolic reflector 12 and fixedly attached to a second portion of the rotating carriage body 18 in the inboard region 26. The folding mirror 10 reflects the beam 90 degrees towards the lower parabolic reflector 8. The angled reflector surface 11 of the folding mirror 10 is positioned at a 45 degree angle such that the folding mirror 10 is adapted to receive or reflect the beam 14 in a generally radial direction to or from the upper parabolic reflector 12 and further receive or reflect the beam 14 in a generally axially direction which is radially offset and parallel from the first axis 22. It is further noted that the folding mirror 10 is positioned such that the primary optical axis 36 of the beam 14 is aligned with the center of the reflective surface 11.

The lower off-axis parabolic reflector 8 is attached to another portion of the carriage body 18 proximate the outboard aperture 24 such that reflector 8 is positioned axially adjacent the folding mirror 10. The lower parabolic reflector 8 has a concave reflective surface 9 adapted to receive or reflect the beam 14 to or from the folding mirror 10, and furthermore, receive or reflect the beam 14 radially from or to the mirror 6 and one-axis gimbal assembly 7. An exemplary lower off-axis parabolic reflector 8 may have a clear aperture of about 60 mm to 80 mm, a decenter of about 60 mm to 80 mm, and a focal length in the range of about 200 mm to 300 mm.

The mirror 6 and one-axis gimbal assembly 7 is positioned 180 degrees radially opposite the lower reflector 8 with respect to first axis 22. The gimbal assembly 7 may include gimbal mounting structure 38 fixedly attached to the rotating carriage 4. The exemplary embodiment depicts a pair of arms 38 which provide mounting structure to form a pair of pivot points defining a second axis 23 or tilt element of which the mirror 6 rotates about. However, it is noted that any form of mounting structure 38 known in the art may be utilized to support the mirror 6 and provide a one-axis gimbal assembly 7 as long as it performs the same function. Preferably, the second axis 23 or tilt element is positioned proximate the interior surface 28 of the window. Thus, the one-axis gimbal assembly 7 may be located on the bottom of the mirror 6 such that the one-axis gimbal assembly 7 acts as a hinge centered about the second axis 23 which is generally parallel to the window 16.

The mirror 6 has rotatable reflective surface oriented to receive or reflect beams 14 radially reflected from the lower parabolic reflector 8 and to receive or reflect beams 14 through or from the outboard aperture 24 and exit pupil window 16. As shown in FIG. 1, the one-axis gimbal assembly 7 is arranged such that the mirror 6 has a range of mechanical motion, θ, of about 0–22.5 degrees. As a result, an optical steering range, α, of 0–45 degrees is produced. Additionally, the shape of mirror 6 is preferably elliptical (see FIG. 2), however, the mirror 6 may have varying shapes known in the art which exhibit similar reflective characteristics.

Another aspect of the present invention is that the one-axis gimbal 7 is decentered from the primary optical axis 36. In particular, the placement of the second-axis 23 or tilt element is outwardly radially offset a predetermined distance x from the primary optical axis 36 as shown in FIG. 1. The benefit from this arrangement is that the inner portion of the rotating carriage 4 is more compact allowing for a smaller mirror 6 and one-axis gimbal assembly 7, which assists in the overall packaging of the conformal design. In particular, such an arrangement allows for the mirror 6 and one-axis gimbal assembly 7 to be positioned as close as possible to the exit pupil window 16 which attributes to the compactness of the CARBS device 2.

The most outboard component is the exit pupil window 16 which is flushly integrated to the outboard aperture 24 region of the cylindrically-shape body 18 of the rotating carriage 4. Preferably, the exiting pupil window 16 may range from about 30 to 50 mm in diameter, however, the pupil diameter may vary according to each specific application.

Example system specifications for another exemplary embodiment of the CARBS device 2 includes a radius of rotation of about 101.6 mm, rotation height of about 203.2 mm, input beam diameter of about 10 mm, input beam FOR of about +/–0.25 degrees, output beam diameter of about 50 mm, full-steering FOR of about 0–58 degrees El, an upper off-axis parabola 12 having a radius of about 60 mm and decenter of about 60 mm, a lower off-axis parabola 8 having a radius of about 300 mm and decenter of about 300 mm, and the mirror 7 and one-axis gimbal assembly having a diameter of about 80 mm.

Functionality of the CARBS Device

The CARBS device 2 is adapted to both transmit and receive laser beams 14. As previously discussed, the CARBS device 2 functions as the coarse-steering component of an electro-optical (EO) system which typically also utilizes a fine-steering element 3.

One aspect of the functionality of the present invention is that the CARBS device 2 applies an optical telescoping effect to the outgoing beam 14. The telescoping effect is applied to the outgoing beam 14 through taking advantage of decentration and off-axis parabolic reflectors 8, 12 to maintain a small footprint. In particular, by utilizing a telescoping effect, a smaller diameter beam 14 may be utilized upstream of the upper off-axis parabolic reflector 12. Then the outgoing beam 14 is telescopically conditioned between the upper and lower parabolic mirrors 8, 12 by widening the beam 14 or changing the magnification of the beam 14. In other words, the off-axis parabolic reflectors 8, 12 basically form a telescope so the diameter or magnification of the beam 14 can be changed. The telescoping effect is schematically shown in FIG. 1 wherein the beam exiting the fine-steering element 3 is a thinner beam having a smaller initial diameter $d_i$ than the outgoing beam which is widened or magnified after being reflected off the upper and lower parabolic reflectors 8, 12 and has a large final diameter $d_f$.

The following paragraphs will now describe the path of an outgoing laser beam 14 and further elaborate on other noteworthy aspects of the present invention. After the beam 14 exits the fine-steering element 3 of the electro-optical system, the beam 14 first encounters the concave reflective surface 13 of the upper off-axis parabolic reflector 12 where the beam 14 is centered about the primary optical axis 36. It is noted that the primary optical axis 36 is initially coincident with the first axis 22 which defines the center axis of the CARBS device 2. The beam 14 is initially a thin beam having an initial diameter $d_i$ in the range of about 5 mm to 10 mm. By utilizing an off-axis parabolic reflector 12, the width or diameter d of the beam 14 is passed through the telescope frame by the two off-axis parabolic reflectors 8, 12.

The beam 14 is then reflected radially towards the folding mirror 10. When the beam 14 contacts the angled reflector surface 11, the beam 14 is then is reflected in a generally axially direction which is radially offset and parallel from the first axis 22. It is further noted that the diameter d of the beam 14 continues to increase until the beam 14 is reflected by the lower off-axis parabolic reflector 8. Additionally, it is noted that the primary optical axis 36 may be offset from the concave reflective surface 9 (inwardly towards the first axis 22) as shown in FIG. 1. As a result, instead of the primary optical axis 36 being coincident with the central ray axis of the lower off-axis parabolic reflector 8, such as is the case with the upper off-axis parabolic reflector 12, the primary optical axis 36 is coincident with the on-axis focal point of the lower off-axis parabolic reflector 8.

After the beam 14 is reflected off the concave reflective surface 9 of the lower off-axis parabolic reflector 8, the beam 14 is directed to the mirror 6. At this point, it is observed that the beam 14 diameter d has been substantially magnified. In particular, it is preferable that the beam 14 diameter d is increased to about 30 mm to 50 mm depending on the mission. The beam 14 is finally reflected from the reflective surface of the mirror 6, through the outboard aperture 24, and out the exit pupil window 16. Also, it is noted that the beam 14 final diameter $d_f$ is maintained constant after it has been reflected off the lower off-axis parabolic reflector 8. Thus, the final diameter $d_f$ is about 30 mm to 50 mm depending on the mission.

As previously mentioned, the mirror 6 has a range of mechanical motion of 0–22.5 degrees about the tilt element or second axis 23 of the one gimbal axis assembly 7. This translates into an optical change of 45 degrees by incidence of reflection (or optical steering range of about 0–45 degrees). Therefore, the one-axis gimbal 7 is only asked to steer over 0–45°, rather than the more typical +/–45°. To compensate for the 045° range, the CARBS device 2 relies on the rotating carriage 4 to rotate 360° in azimuth, providing for a full field of regard (FOR).

Based on the aforementioned features, the CARBS system 2 meets the following specifications, within reasonable size, weight, and power requirements (SWAP): (1) the ability to be installed conformally with the skin of a vehicle, and still achieve a steering field of regard (FOR) of 180° Az and +/−45° El; (2) the ability to maintain achromaticity over the range of 1 $\mu$m<$\lambda$<12 $\mu$m; and (3) the ability to maintain both coherence and phase across the wavefront.

Exemplary Installation of CARBS in an Aircraft

FIG. 3 depicts a conventional prior art electro-optical (EO) infrared laser ball-turret 1 installed and integrated into the fuselage 40 of an aircraft, wherein the turret 1 is adapted to transmit and receive laser beams 14. This prior art EO system component is not "conformal" to the outer skin of the aircraft. Rather, the ball-turret 1 has a high aerodynamic drag, a large radar cross section, and a much greater potential to obscure adjacent electro-optic (EO) systems.

FIG. 4 depicts an exemplary installation of a plurality of CARBS devices 2 on a modern military aircraft. It is noted that a plurality of CARBS devices 2 may be utilized in conjunction with each other to provide 4$\pi$ steradian coverage, which is considered the most optimal coverage. That is, full spherical coverage about the platform would subtend a solid angle of 4$\rho$ steradian (sr).

Moreover, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A beam-steering device comprising:
   a carriage adapted to rotate about a first axis, said carriage having an inboard region and an outboard aperture;
   an upper off-axis parabolic reflector adapted to receive or reflect a beam directed generally along said first axis and receive or reflect the beam in a generally radial direction generally orthogonal to the first axis;
   a right-angle reflector radially offset from said upper reflector and adapted to receive or reflect the beam in a generally radial direction to or from said upper reflector and receive or reflect the beam in a generally axially direction which is radially offset from said first axis;
   a lower off-axis parabolic reflector adapted to receive or reflect the beam to or from said right angle reflector and to receive or reflect the beam in a radially direction generally through and orthogonal to the first axis, said lower reflector positioned axially adjacent said right angle reflector such that the primary optical axis of the beam intersects an on-axis focus point of said lower reflector; and
   a mirror and one-axis gimbal assembly positioned 180 degrees radially opposite said lower reflector and adapted to rotate about a second axis being radially offset from and orthogonal to the first axis, said mirror adapted to receive or reflect beams radially reflected from said lower reflector and to receive or reflect beams through said outboard aperture.

2. The beam-steering device according to claim 1, wherein said device is totally all reflective.

3. The beam-steering device according to claim 1, wherein said device is adapted to be installed conformally and flush with the skin of a vehicle.

4. The beam-steering device according to claim 1, wherein said device achieves a steering field of regard (FOR) of 180° Az and +/−45° El.

5. The beam-steering device according to claim 1, wherein said device maintains achromaticity over the range of 1 $\mu$m<$\lambda$<12 $\mu$m.

6. The beam-steering device according to claim 1, wherein when the beam is transmitted from said device, maintenance of both coherence and phase across the wavefront is achieved.

7. The beam-steering device according to claim 1, said carriage comprising a cylindrically-shaped body and a retaining base which is adapted to rotatably receive and retain said cylindrically-shaped body.

8. The beam-steering device according to claim 7, said retaining base adapted to be rigidly mounted to a vehicle structure.

9. The beam-steering device according to claim 8, further comprising an exit pupil window securely attached to the retaining base of said rotating carriage.

10. The beam-steering device according to claim 1, wherein said one-axis gimbal assembly steers only over 0–45 degrees El.

11. The beam-steering device according to claim 1, wherein the initial diameter of the beam is telescopically magnified to a final diameter $d_f$.

12. The beam-steering device according to claim 11, the final diameter $d_f$ being between about 30–50 mm depending on the mission.

13. The beam-steering device according claim 11, wherein the telescopic magnification occurs between the upper reflector and the lower reflector.

14. The beam-steering device according to claim 1, wherein a mechanical range of motion $\theta$ of said mirror about a tilt axis of said one-axis gimbal assembly is about 0–22.5 degrees.

15. The beam-steering device according to claim 14, wherein an optical steering range $\alpha$ of 0–45 El degrees is produced.

16. The beam-steering device according to claim 1, in combination with a fine-steering element.

17. The beam-steering device according to claim 1, said outboard aperture having a diameter ranging from about 3 to 4 inches.

18. The beam-steering device according to claim 1, said carriage adapted to rotate 360 degrees about the first axis in a clockwise and counterclockwise direction.

19. The beam-steering device according to claim 1, said one-axis gimbal assembly and mirror further outwardly offset a predetermined distance x from the primary optical axis of the beam.

20. The beam-steering device according to claim 9, said one-axis gimbal having a tilt element centered about the second axis, wherein the second axis is oriented in parallel with respect to said exit pupil window, and further wherein the second axis is positioned substantially proximate an interior surface of said exit pupil in said outboard aperture.

21. The beam-steering device according to claim 20, said mirror having a lowest edge connected to said tilt element such that said mirror hingedly rotates about said tilt element.

22. A conformal and all-reflective beam-steering device comprising:
- a rotating carriage adapted to rotate 360 degrees about a first axis, said carriage having an inboard region and an outboard aperture;
- an upper off-axis parabolic reflector having a first concave reflective surface centered about the first axis, said upper reflector adapted to receive or reflect a beam directed generally along said first axis and receive or reflect the beam in a generally radial direction generally orthogonal to the first axis, said upper reflector fixedly attached to a first portion of said inboard region of said rotating carriage;
- a right-angle reflector radially offset from said upper reflector and arranged such that a reflector surface of said right angle reflector is centered about and oriented at a 45 degree angle with respect to a primary optical axis of the beam, said right angle reflector adapted to receive or reflect the beam in a generally radial direction to or from said upper reflector and adapted to receive or reflect the beam in a generally axially direction which is radially offset from said first axis, said right angle reflector fixedly attached to a second portion of said inboard region of said rotating carriage;
- a lower off-axis parabolic reflector having a second concave reflective surface positioned to receive or reflect the beam to or from said right angle reflector and to receive or reflect the beam in a radially direction generally through and orthogonal to the first axis, said lower reflector positioned axially adjacent said right angle reflector such the primary optical axis of the beam intersects an on-axis focus point of said lower reflector, said lower reflector fixedly attached to a third portion of said inboard region of said rotating carriage; and
- a mirror and one-axis gimbal assembly positioned 180 degrees radially opposite said lower reflector and fixedly attached to a fourth portion of said rotating carriage, said mirror assembly adapted to rotate about a second axis being radially offset from and orthogonal to the first axis, and further offset a predetermined distance from the primary optical axis of the beam, said mirror assembly having a tiltable reflective surface oriented to receive or reflect beams radially reflected from said lower reflector and to receive or reflect beams through said outboard aperture.

23. The beam-steering device according to claim 22, wherein said device is totally all-reflective.

24. The beam-steering device according to claim 22, wherein said device is adapted to be installed conformally and flush with the skin of a vehicle.

25. The beam-steering device according to claim 22, wherein said device achieves a steering field of regard (FOR) of 180° Az and +/−45° El.

26. The beam-steering device according to claim 22, wherein said device maintains achromaticity over the range of 1 $\mu m < \lambda < 12$ $\mu m$.

27. The beam-steering device according to claim 22, wherein when the beam is transmitted from said device, maintenance of both coherence and phase across the wavefront is achieved.

28. The beam-steering device according to claim 22, said rotating carriage comprising a cylindrically-shaped body and a retaining base which is adapted to rotatably receive and retain said cylindrically-shaped body.

29. The beam-steering device according to claim 28, said retaining base adapted to be rigidly mounted to a vehicle structure.

30. The beam-steering device according to claim 29, further comprising an exit pupil window securedly attached to the retaining base of said rotating carriage.

31. The beam-steering device according to claim 22, wherein said one-axis gimbal steers only over 0–45 degrees El.

32. The beam-steering device according to claim 22, wherein the initial diameter of the beam is telescopically magnified to a final diameter $d_f$.

33. The beam-steering device according to claim 32, the final diameter $d_f$ being between about 30 mm to 50 mm depending on the mission.

34. The beam-steering device according claim 32, wherein the telescopic magnification occurs between the upper reflector and the lower reflector.

35. The beam-steering device according to claim 22, wherein a mechanical range of motion $\theta$ of said mirror about a tilt axis of said one-axis gimbal assembly is about 0–22.5 degrees.

36. The beam-steering device according to claim 35, wherein an optical steering range $\alpha$ of 0–45 degrees El is produced.

37. The beam-steering device according to claim 22, in combination with a fine-steering element.

38. The beam-steering device according to claim 22, said outboard aperture having a diameter ranging from about 3 to 4 inches.

39. The beam-steering device according to claim 22, said one-axis gimbal assembly and mirror further outwardly offset a predetermined distance x from the primary optical axis of the beam.

40. The beam-steering device according to claim 28, said one-axis gimbal having a tilt element centered about the second axis, wherein the second axis is oriented in parallel with respect to said exit pupil window, and further wherein the second axis is positioned substantially proximate an interior surface of said exit pupil in said outboard aperture.

41. The beam-steering device according to claim 40, said mirror having a lowest edge connected to said tilt element such that said mirror hingedly rotates about said tilt element.

* * * * *